United States Patent Office 2,865,809
Patented Dec. 23, 1958

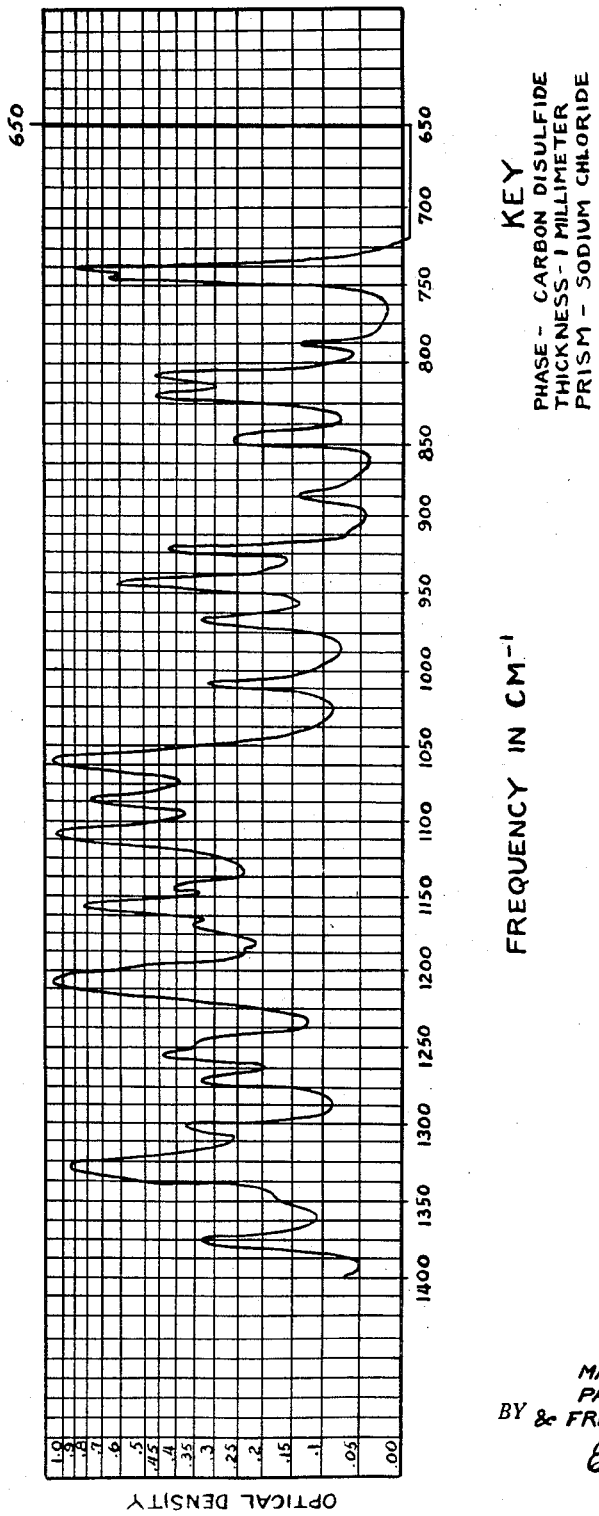

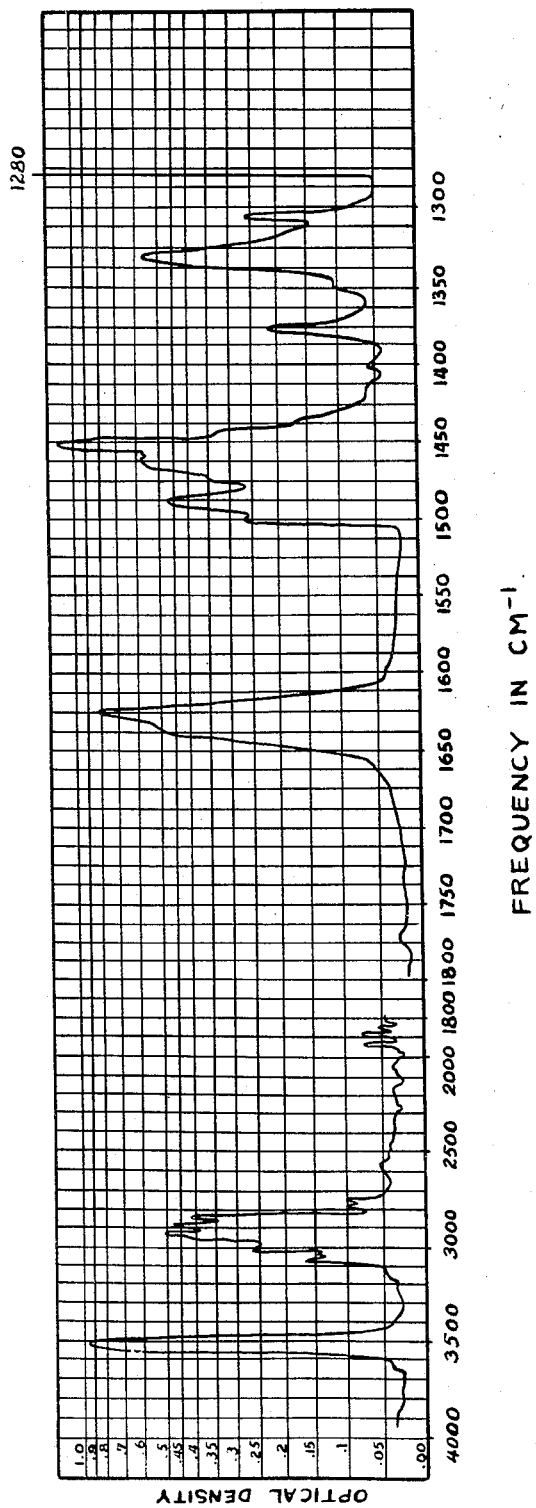

2,865,809
SUBSTANCE HAVING ANTIOXIDANT ACTIVITY AND ITS PREPARATION FROM YEAST

Martin Forbes, Silver Spring, Md., Paul György, Villanova, and Friedrich Zilliken, Philadelphia, Pa., assignors to the trustees of the University of Pennsylvania, Philadelphia, Pa.

Application August 11, 1955, Serial No. 527,784

9 Claims. (Cl. 167—81)

This invention relates to a new vitamin-like chemical compound possessing outstanding activity as an antioxidant, especially useful as an antioxidant when added to food products such as edible fats and other edible products which are subject to deterioration in the presence of air or oxygen. Our new compound is also characterized by important biological activity, and may be used for therapeutic purposes as, for example, preventing liver necrosis in experimental animals. Our invention is also concerned with the novel procedure by which the new chemical compound can be recovered from yeast.

More particularly, our invention is especially concerned with the extraction, from yeast, of a biological factor which exhibits biological activity of several kinds, being especially effective in preventing hemolysis by dialuric acid of erythrocytes from vitamin E-deficient rats. Our new chemical compound is also characterized by antioxidant activity of a remarkable degree.

It is already known that tocopherols and certain other antioxidants when admixed in vitro with red blood cells from rats whose diets are deficient in vitamin E will prevent their hemolysis by dialuric acid. Our new biological factor is present in dry commercial yeast, such as Fleischmann Baker's Yeast (Standard Brands, Inc., New York) or British Baker's Yeast (Distillers Corporation, Glasgow, Scotland). Brewer-type yeast, such as that sold by Standard Brands, Inc., is especially rich in the new biological factor. It may be readily extracted from yeast in accordance with the procedure described below. It exhibits, similar to tocopherol, the ability to prevent hemolysis by dialuric acid of erythrocytes from rats whose diet is deficient in vitamin E.

As a comparison of the relative ability to prevent hemolysis, we have used a potent commercial antioxidant, N-phenyl-2-naphthylamine, as a standard. Under the conditions of the standard test (see the paper of Rose and György published in "Blood," vol. 5, page 1062, 1950), 0.025 µg. (but not 0.01 µg.) of recrystallized N-phenyl-2-naphthylamine prevented the hemolysis by dialuric acid of the deficient erythrocytes. The crystalline substance described below which we have isolated from yeast prevented hemolysis at the 0.25 µg. level but not at the 0.1 µg. level. Its activity therefore falls in the range of the activity of dl α-tocopherol.

Our procedure for isolating the new vitamin-like material in crystalline form from yeast will now be described.

A 20 percent suspension (w./v.) of Fleischmann Baker's Yeast, Type 5009, in 95 percent redistilled ethanol was refluxed for 6–8 hours. The alcoholic extract was then filtered over a Buchner funnel. The residue was discarded and the filtrate was allowed to stand overnight at 5° C. The material precipitating out in the cold was filtered off and the filtrate was evaporated to dryness in vacuo. The dry residue was taken up in redistilled methanol (100 grams of residue in 1000 milliliters of methanol). The methanol solution was allowed to stand at −40° C. overnight and filtered in the cold. The precipitate was washed with cold redistilled methanol and discarded. The filtrate and the washings were evaporated to dryness in vacuo and under nitrogen, and the residue was suspended in a 0.05 molar phosphate buffer solution of pH 7.4 (100 grams of residue in 1000 ml. of phosphate buffer). The pH of the suspension was adjusted to pH 7.4 by the addition of 2 N sodium hydroxide solution. The suspension was then continuously extracted with redistilled ether for 48 hours. The ether extract was dried over sodium sulfate, the solution filtered, the ether filtrate evaporated to dryness in vacuo under nitrogen and all of the residue taken up in the necessary amount of purified petroleum ether. Ether extraction results in a four-fold enrichment of material which has activity in the prevention of hemolysis by dialuric acid of red blood cells from vitamin E-deficient rats.

In preparing the purified petroleum ether, a reagent grade of the solvent was shaken with aliquot parts of sulfuric acid until the acid remained colorless. The ether was then shaken with 1 percent aqueous sodium bicarbonate solution, distilled, and stored over calcium chloride, thereby resulting in the purified petroleum ether used above.

Aliquots of the petroleum ether extract were then chromatogrammed on Florisil (60 to 100 mesh) which had previously been washed with methanol and dried at 110° C.

Florisil is the trademark name for magnesium silicate as supplied by Floridin Company of Warren, Pennsylvania. As supplied, it is comminuted to 60–100 mesh, i. e., will pass through a standard screen having 60 meshes to the inch and will be retained on a standard screen having 100 meshes to the inch. A proportion of 15 grams of adsorbent for each gram of dry weight of material soluble in warm petroleum ether was found to give satisfactory separation (see table). One of the fractions which could be eluted with petroleum ether and which could be followed on the column by its blue fluoroescence was evaporated under nitrogen to a small volume and left to stand at 5° C.

White needles precipitated out of the yellow solution. The needles were recrystallized three times from petroleum ether. The melting point after the second and third recrystallizations did not change and remained at 118° C. (uncorr.).

In the hemolysis test, 0.25 µg. of crystals prevented hemolysis in the standard test. The activity of the crystalline material is therefore in the range of that of dl α-tocopherol.

On reverse phase paper chromatography following the method of Eggitt et al., J. Sci. Food Agric., vol. 4, page 176 (1953) the substance has an Rf of 0.84. The spot can be detected by its blue fluorescent in ultra-violet light or by the red color developed after spraying it with Emmerie Engel reagents (0.5 percent 2,2′ bipyridine in ethanol and 0.255 percent ferric chloride in ethanol).

In the Emmerie Engel test (see Hawk et al., "Practical Physiological Chemistry," 1954, page 1173) crystals like N-phenyl-2-naphthylamine developed full color only 20 minutes after addition of the reagents. On dry weight basis the crystals of our novel compound had about half the reducing power of N-phenyl-2-naphthylamine. Elemental analysis of the substance gave, in a representative example, the following values: C, 67.58 percent; H, 4.54 percent; O, 27.15 percent; $CH_3O$—, 10.18 percent. It has the empiric formula $C_{16}H_{12}O_5$.

The fractions recovered during the chromatography on a Florisil column of 60 to 100 mesh, as described above, are given in the following table. The Florisil column was 3 centimeters in diameter, had a length of 16.5 centimeters, and contained 60 grams of Florisil. Previous to use it had been washed with methanol and dried at a temperature of 110° C.

The material subjected to chromatography on the Florisil column was a petroleum ether extract containing 4.3 grams of solute; the activity, totaling 140,000 units, amounted to 33 units per milligram. A unit is the minimum amount of dry weight required to prevent hemolysis by dialuric acid of erythrocytes from vitamin E-deficient rats.

Table

| Fraction | Solvent | Volume in Milliliters | Dry Weight in Milligrams | Units Per Milligram | Total Units of Activity |
| --- | --- | --- | --- | --- | --- |
| 1 | Petroleum ether | 250 | 113 | | |
| 2 | ___do___ | 250 | 75 | | |
| 3 | ___do___ | 500 | 78 | 100 | 7,800 |
| 4 | ___do___ | 500 | 26 | 2,000 | 52,000 |
| 5 | Petroleum ether+1 percent ethanol | 500 | 89 | 400 | 35,600 |
| 6 | Ethanol | 250 | 660 | | |
| 7 | ___do___ | 500 | 570 | | |
| | | | | | 95,400 |

The infra-red absorption spectrum indicates that the new substance is an ortho-substituted phenyl (benzol) compound. However, it does not give the Folin-Ciocalteau test and the test with ferric chloride yields a yellow-brown coloration. Tests definitely establish that it contains no methyl groups linked to carbon. Its average molecular weight is 280.

A solution of the substance of 1 percent concentration in absolute ethanol shows no optical rotation, and the substance therefore probably does not contain an asymmetric carbon atom.

The substance cannot be extracted from yeast with petroleum ether. When yeast is extracted with absolute (100 percent) alcohol, the yield is only about 10 percent of that obtained by using 90–95 percent alcohol in the extraction. It is therefore believed that the substance may be present in the yeast in a complex form, from which it has to be liberated in the presence of water.

The crystals of the compound show strong blue fluorescence in ultra-violet light. The ultra-violet spectrum in ethanol shows high absorption at the low wavelengths, a minimum at 262 m$\mu$ and a broad maximum at 300–303 m$\mu$. When the ultra-violet absorption spectrum is determined in 1 N hydrochloric acid, the maximum is shifted from 303 m$\mu$ to 290 m$\mu$. In 1 N sodium hydroxide solution, the ultra-violet absorption spectrum shows two maxima, i. e., at 245 m$\mu$ and at 330 m$\mu$. At pH 7.3 (phosphate buffer), Maximum $E^{1\%}_{1cm}$ is at 295 m$\mu$ The fluorescence of the new compound decreases with increased acidity and disappears entirely at an acidity corresponding to that of 3 N hydrochloric acid. In contrast, an alkaline reaction increases the blue fluorescence. An acid solution of the substance regains its blue fluorescence when it is rendered neutral in reaction, or is made alkaline.

*Infra-red absorption spectrum*

A solution of the compound in carbon disulfide, or in carbon tetrachloride, as shown, respectively, by Figs. 1 and 2 of the drawing, shows many characteristic absorption bands in the infra-red absorption spectrum. On these figures of the drawing the optical density is the reciprocal of the percent transmittance, i. e., $$E = \frac{1}{E_0}$$

where E is the percent extinction (optical density) and $E_0$ is the percent transmittance. Among these are peaks at the following frequencies, expressed in cm.$^{-1}$. (Note:—3510 cm.$^{-1}$ equals 3.5 angstrom units, i. e., 3.5 A.): 3510; 3070; 3040; 3010; 2925; 2895; 2850; 2790; 2765; 1930; 1890; 1850; 1810; 1772; 1632; 1625; 1500; 1487; 1461; 1451; 1416; 1401; 1376; 1349; 1330; 1304; 1271; 1254; 1207; 1168; 1156; 1144; 1110; 1085; 1060; 1010; 967; 943; 921; 888; 849; 820; 808; 787; 744; and 738.

As indicated on the drawing, that portion of the infra-red spectrum included on Fig. 1 of the drawing, from frequency 650 cm.$^{-1}$ to frequency circa 1400 cm.$^{-1}$, was determined in carbon disulfide, using a cell of 1 millimeter thickness and a sodium chloride prism. That portion of the infra-red spectrum included on Fig. 2, from frequency circa 1300 cm.$^{-1}$ to frequency 4000 cm.$^{-1}$, was determined in carbon tetrachloride using a cell of 1 millimeter thickness and a calcium fluoride prism.

The aromatic nature of the compound is shown by the absorption above 300 cm.$^{-1}$ at 3070 cm.$^{-1}$. One at least, and possibly the two absorptions at 1632 and 1625 cm.$^{-1}$ are ring vibrations from the aromatic system. The aromatic system is further confirmed by the absorption in the vicinity of 1500 cm.$^{-1}$.

The location of the bands can give some indication of the nature of the substitution in the benzene ring. The fact that there is no absorption below 700 cm.$^{-1}$ strongly indicates the presence of an ortho-substituted phenyl ring. The simple band at 3510 cm.$^{-1}$ suggests an associated hydroxyl group.

The novel compound may be hydrogenated and will take up 4 moles of hydrogen under mild conditions of hydrogenation, i. e., the use of palladium supported on barium sulfate, using 5 percent of the catalyst. Under stronger conditions of hydrogenation, 10 moles of hydrogen are absorbed, based on a molecular weight for the new compound of 273. By stronger conditions are typically meant the use, for example, of 7.6 milligrams of platinum oxide with 1.4 milligrams of the new substance and 2.0 milliliters of glacial acetic acid, the hydrogen being introduced under pressure.

The new substance will not only prevent the hemolysis of red blood cells obtained from vitamin E-deficient rats in vitro but it will also prevent hemolysis when given to the rats in vivo. The new compound therefore exerts a real physiological (nutritional) function. The vitamin E-like activity of dried yeast, such as has been observed for example by Hill et al., of the Department of Poultry Husbandry, Cornell University, as reported at Federation Proceedings, vol. 14, page 449 (1955), is probably due to the presence of our novel substance in the yeast.

The new substance is valuable as an antioxidant for usual purposes, especially for food products such as fats, baby foods, whole milk, milk products, etc. For such purposes a small amount, ordinarily less than 1 percent by weight, of the material is added to the foodstuff whose oxidation is to be prevented or controlled. In some cases larger amounts, i. e., up to 5 percent by weight, may be added, and amounts as low as 0.1 percent, or even lower, will often give very satisfactory results, so active as an antioxidant is the new compound.

Various changes and modifications may be made in our invention as herein described without departing from the scope thereof. Such changes and modifications as are encompassed within the scope of the appended claims are intended to constitute part of our invention.

We claim:

1. A crystalline organic compound capable of preventing hemolysis of red blood cells of vitamin E-deficient rats and characterized by antioxidant activity, said compound having a molecular weight of approximately 280, the empiric formula $C_{16}H_{12}O_5$, and a melting point of approximately 118° C., crystallizing characteristically in needle crystals which crystals exhibit blue fluorescence in ultra-violet light, which fluorescence decreases, in solution, with increased acidity and disappears entirely at an acidity corresponding to that of 3N hydrochloric acid; the ultra-violet spectrum of said compound in ethanol showing absorption at wavelengths in the ultra-violet part of the spectrum, a minimum at 262 m$\mu$, and a broad maximum at 300–303 m$\mu$; in the infra-red spectrum showing the following characteristic frequency peaks, expressed in cm.$^{-1}$: 3510; 3070; 3040; 3010; 2925; 2895; 2850; 2790; 2765; 1930; 1890; 1850; 1810; 1772; 1632; 1625; 1500; 1487; 1461; 1451; 1416; 1401; 1376; 1349; 1330; 1304; 1271; 1254; 1207; 1168; 1156; 1144; 1110; 1085; 1060; 1010; 967; 943; 921; 888; 849; 820; 808; 787; 744; and 738; said frequency peaks being determined, in the frequency range 4000 cm.$^{-1}$ to 1300 cm.$^{-1}$ from a solution of said organic compound in carbon tetrachloride, and in the frequency range 1400 cm.$^{-1}$ to 650 cm.$^{-1}$ from a solution of said organic compound in carbon tetrachloride, and in the frequency range 1400 cm.$^{-1}$ to 650 cm.$^{-1}$ from a solution of said organic compound in carbon disulfide; and said compound being aromatic in nature and capable of being hydrogenated to absorb up to 4 moles of hydrogen per mole of said compound.

2. A crystalline material capable of preventing hemolysis of red blood cells of vitamin E-deficient rats and characterized by antioxidant activity, said material having the empiric formula $C_{16}H_{12}O_5$, exhibiting blue fluorescence in solution under alkaline and substantially neutral conditions, being substantially unextractable from yeast with petroleum ether but capable of being extracted therefrom in substantial amounts with 90-95 percent aqueous alcohol, solutions of said material exhibiting, in the infra-red spectrum, characteristic peaks at the following frequencies expressed in cm.$^{-1}$: 3510; 3070; 3040; 3010; 2925; 2895; 2850; 2790; 2765; 1930; 1890; 1850; 1810; 1772; 1632; 1625; 1500; 1487; 1461; 1451; 1416; 1401; 1376; 1349; 1330; 1304; 1271; 1254; 1207; 1168; 1156; 1144; 1110; 1085; 1060; 1010; 967; 943; 921; 888; 849; 820; 808; 787; 744; and 738 said frequency peaks being determined, in the frequency range 4000 cm.$^{-1}$ to 1300 cm.$^{-1}$ from a solution of said organic compound in carbon tetrachloride, and in the frequency range 1400 cm.$^{-1}$ to 650 cm.$^{-1}$ from a solution of said organic compound in carbon disulfide.

3. The method of extracting from yeast a material possessing antioxidant activity which is capable of preventing hemolysis by dialuric acid of red blood cells from rats depleted in vitamin E, which comprises: dissolving said yeast in 90-95 percent aqueous ethanol by bringing said yeast into contact with said solvent at its boiling point; removing inactive material from the resulting extract by subjecting said extract to a low temperature, thereby precipitating out inactive material; filtering off said precipitated material and evaporating the resulting clear filtrate to dryness at a reduced pressure less than atmospheric; redissolving the resulting dry extract in methanol; allowing said methanolic solution to stand at a low temperature until inactive material precipitates therein, and removing said insoluble inactive material from said solution; evaporating the resulting clear liquid to dryness at a reduced pressure less than atmospheric and under an inert atmosphere; suspending the dry residue in a 0.05 molar phosphate buffer solution approximately 100 grams of said residue being suspended in 1000 milliliters of said phosphate buffer, and adjusting the pH thereof to a pH on the alkaline side; extracting the resulting suspension with ether, drying the resulting ether extract and removing the insoluble material therefrom; evaporating the resulting clear filtrate to dryness under reduced pressure and in the presence of an inert atmosphere until said ether is removed therefrom; dissolving the resulting solid residue in petroleum ether; subjecting the resulting petroleum ether solution to chromatography on a magnesium silicate column, and removing the active material adsorbed on said column therefrom by means of warm petroleum ether, thereby eluting said adsorbed active material from said magnesium silicate adsorbent; and evaporating the resulting eluate under an inert atmosphere to a small volume and cooling, thereby securing said active material in crystalline form.

4. The method of extracting from yeast a material possessing antioxidant activity which is capable of preventing hemolysis by dialuric acid of red blood cells from rats depleted in vitamin E, which comprises: treating the yeast with 90-95 percent aqueous ethanol at the boiling point of said aqueous ethanol; removing inactive material from the resulting extract by subjecting said extract to a low temperature, thereby precipitating out inactive material; filtering off said precipitated material and evaporating the resulting clear filtrate to dryness at a reduced pressure less than atmospheric; redissolving the resulting dry extract in methanol; allowing said methanolic solution to stand at a low temperature until inactive material precipitates therein, and removing said insoluble inactive material from said solution; evaporating the resulting clear liquid to dryness at a reduced pressure less than atmospheric and under an inert atmosphere; suspending the dry residue in a 0.05 molar phosphate buffer solution, approximately 100 grams of said residue being suspended in 1000 milliliters of said phosphate buffer, and adjusting the pH thereof to approximately 7.4; extracting the resulting suspension with ether; drying the resulting ether extract and removing insoluble material therefrom; evaporating the resulting clear filtrate to dryness under reduced pressure and in the presence of an inert atmosphere until said ether is removed therefrom; dissolving the resulting solid residue in petroleum ether; subjecting the resulting petroleum ether solution to chromatography on a column of finely comminuted magnesium silicate and removing the active material adsorbed on said column by elution therefrom with warm petroleum ether; and evaporating the resulting eluate under an inert atmosphere to a small volume and cooling, thereby securing said active material in the form of white needles of melting point approximately 118° C. and empiric formula $C_{16}H_{12}O_5$.

5. The method of extracting from yeast, in crystalline form, a material possessing antioxidant activity and capable of preventing hemolysis by dialuric acid of erythrocytes from vitamin E-deficient rats, which comprises: preparing a solution of commercial dry yeast in 90-95 percent aqueous ethanol by bringing said yeast into contact with said aqueous ethanol at the boiling point thereof; cooling the resulting solution, thereby precipitating out insoluble inactive material; evaporating the resulting clear solution to dryness, thereby securing a dry residue; redissolving said dry residue in redistilled methanol; allowing the resulting solution to stand at a temperature of −40° C., thereby precipitating out additional insoluble inactive material; evaporating the resulting clear solution to dryness under a reduced pressure and inert atmosphere, thereby securing a dry residue; suspending said dry residue in a 0.05 molar phosphate buffer solution of pH 7.4, approximately 100 grams of said residue being suspended in 1000 milliliters of said phosphate buffer, and adding sufficient alkali to adjust the pH thereof to one on the alkaline side; extracting said resulting suspension with ether, and drying said ether extract; removing insoluble materials from said ether extract, and evaporating the resulting clear solution at a reduced pressure of inert gas, thereby securing a dry product; dissolving said dry product in petroleum ether, thereby securing a solution of said active material therein; subjecting said petroleum ether solution to chromatography on a column of magnesium silicate, and eluting said column with warm petroleum ether to remove the active material adsorbed thereon; cooling the resulting solution and evaporating it to small volume under an inert atmosphere; and allowing said resulting concentrated solution to stand at a low temperature until needle crystals of said new material crystallize out therefrom.

6. A food composition comprising an edible substance and up to 1 percent by weight of said crystalline organic compound defined in claim 1.

7. A dry food composition comprising an edible product and an antioxidant, said antioxidant comprising the crystalline organic compound defined in claim 1 present in amounts ranging from 0.1 percent to 5 percent by weight of said dry composition.

8. A food composition stabilized against deterioration in the presence of oxygen, said composition comprising a fat-containing edible food product and up to 1 percent by weight of said crystalline organic compound defined in claim 1.

9. A food composition stabilized against deterioration in the presence of oxygen which comprises an edible material containing milk and from 0.1 percent to 5 percent by weight of said crystalline organic compound defined in claim 1.

References Cited in the file of this patent

UNITED STATES PATENTS

| | | |
|---|---|---|
| 2,282,792 | Musher | May 12, 1942 |
| 2,282,793 | Musher | May 12, 1942 |
| 2,320,479 | Sperti | June 1, 1943 |
| 2,638,435 | Fugazzotto | May 12, 1953 |

UNITED STATES PATENT OFFICE

CERTIFICATE OF CORRECTION

Patent No. 2,865,809                                December 23, 1958

Martin Forbes et al.

It is hereby certified that error appears in the above numbered patent requiring correction and that the said Letters Patent should read as corrected below.

In the grant, lines 3 and 4, name of assignee, for "the trustees of the University of Pennsylvania" read -- The Trustees of the University of Pennsylvania --; line 13, for "Trustees of the University of Pennsylvania" read -- The Trustees of the University of Pennsylvania --; in the heading to the printed specification, line 6, for "the trustees of the University of Pennsylvania" read -- The Trustees of the University of Pennsylvania --; column 4, line 14, for "300" read -- 3000 --; column 5, lines 11 to 14, strike out "tetrachloride, and in the frequency range 1400 cm.$^{-1}$ to 650 cm.$^{-1}$ from a solution of said organic compound in carbon".

Signed and sealed this 7th day of April 1959.

(SEAL)
Attest:

KARL H. AXLINE                                              ROBERT C. WATSON

Attesting Officer                                      Commissioner of Patents